June 11, 1957 G. SALJE 2,795,174
CAMERA FILM FEED MECHANISM
Filed Aug. 24, 1954 2 Sheets-Sheet 1

INVENTOR:
Günther SALJE

BY A. J. Michel
ATTORNEY

June 11, 1957 G. SALJE 2,795,174
CAMERA FILM FEED MECHANISM
Filed Aug. 24, 1954 2 Sheets-Sheet 2

INVENTOR:
Günther SALJE

BY A J Michel

ATTORNEY

2,795,174

CAMERA FILM FEED MECHANISM

Günther Salje, Freiburg im Breisgau, Germany

Application August 24, 1954, Serial No. 451,736

8 Claims. (Cl. 95—31)

The invention relates to a means for feeding roll films in photographic cameras, which means renders it possible for perforated or unperforated film strips to be advanced in one direction of movement by means of a positively acting supporting clutch and a co-operating film support which travels therewith. With this arrangement, the film strip is to be pushed into a chamber in the camera and the supply spool is to be dispensed with, so that at the same time an unnecessarily exposed leading portion of the film strip is avoided.

The characteristic of known arrangements consists in that the film strip in the camera is wound into the cassette chamber by means of a feed roller, feed sprocket or direct rotation of a spool core. Such arrangements always make it necessary to have a take-up spool.

Even similarly acting feeding devices, with which a resilient pressure element must first press the film on to a fixed image aperture frame in order to push the roll film into the cassette chamber, have the disadvantage that a releasing movement and a feeding movement must be carried out by means of a control knob.

As compared with the arrangement referred to above, the novel means comprises a feeding device with which the longitudinal advancing movement takes place without previously pressing-in a control knob. The accompanying drawing of a construction shows, for example, a film feeding mechanism in a stereoscopic camera with which, without using a take-up spool, the film is advanced with equal travel intervals into the chamber of the camera. The film strip is engaged positively; it is only necessary for the control knob to be moved longitudinally. The film is forced by two cams against the travelling web of the film support and positively driven.

Figure 1:
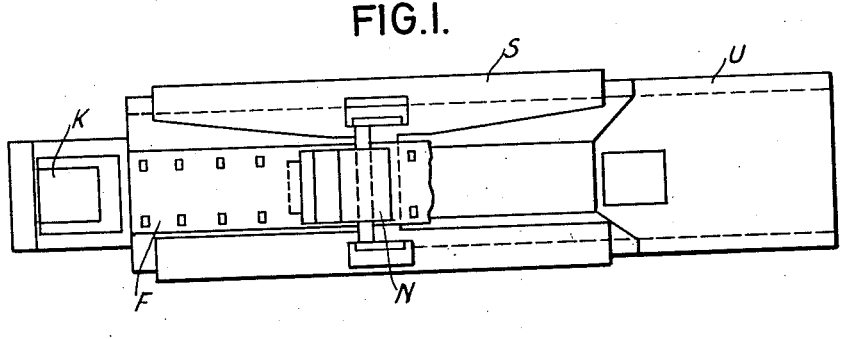
Fig. 1 shows a top view of the feed mechanism.
Figure 2:
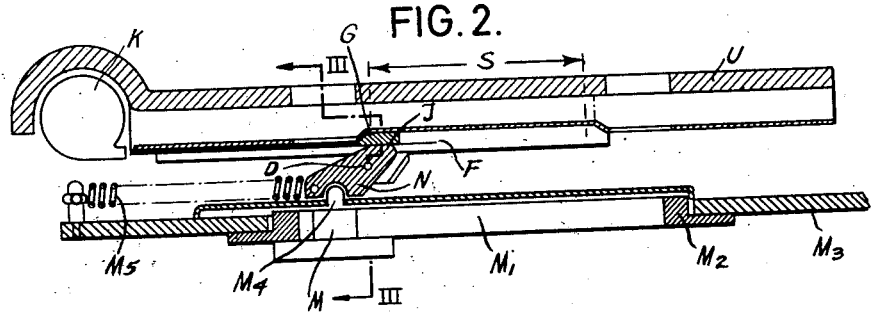
Fig. 2 is a section of the mechanism.
Figure 3:
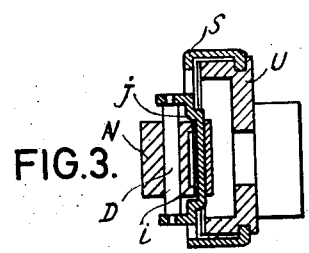
Fig. 3 is a section along line III—III of Fig. 2.
Figure 4:
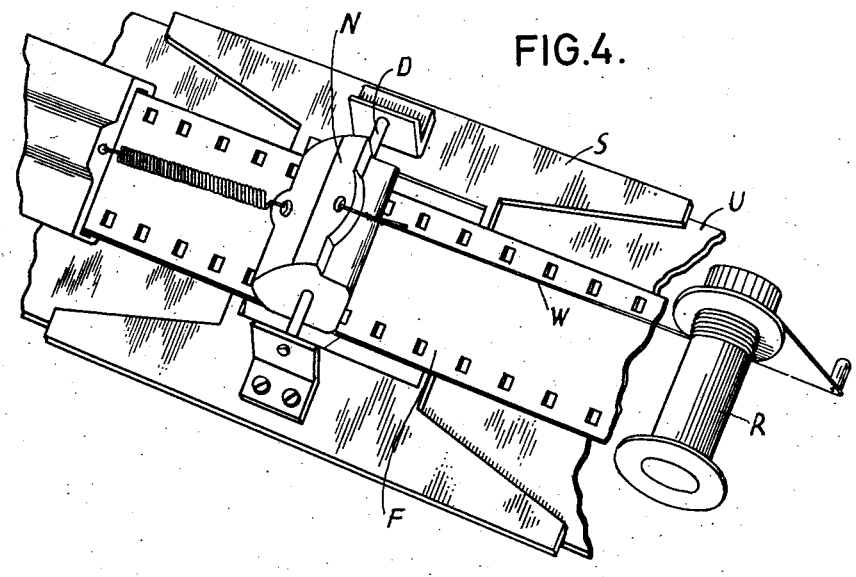
Fig. 4 is a perspective view showing another embodiment of the invention.

In the constructional example of the invention shown the drawings (Figures 1, 2, 3 and 4), the film support S is guided for sliding movement in the base plate U. The web G of the film support lies in the plane of the film. A cam lever N also mounted rotatably on the film support is in engagement with a control knob M of the camera housing. A plate $M_2$ is attached to housing wall $M_3$ of the camera and said plate is provided with a slot $M_1$ which provides passage for the control knob M; the latter is integral with a projecting finger $M_4$ whose end is engaged in a corresponding concave recess of a lever of cam N, thus causing the cam to pivot around its fulcrum D when control knob M is moved in the slot $M_1$. The two projections $i$ of the cam lever N are forced on the margin of the film. Cam N is a two-armed lever pivotable on fulcrum D. The movement of the control knob M to the right in slot $M_1$ brings forth a torque which acts on cam N in counterclockwise direction and the two projections $i$ located at the top and the bottom of the other arm of cam N press against the upper and the lower edge of the film, bring the film in contact with a web of film support G and impart movement to the film and to the web of film support G, the latter travelling in a depression of a film guide attached to the inner wall of the camera. The movement of the projections $i$ is originated by the movement of the control knob M in slot $M_1$, whereby a pre-determined length of the film is advanced. A tension spring $M_5$ has one end fixedly mounted on a hook provided on the inner side of wall $M_3$ of the camera housing and has the other end attached to cam N, thus exerting a pulling force on the arm of the lever adjacent the wall of the camera where the slot for the control knob is provided. After the control knob has been moved to the position of extreme right in the slot and thus completed the pre-determined advance movement of the film, also to the right, spring $M_5$ causes the arm of the cam to which it is attached to rebound, causing simultaneously a clockwise rotation of cam N sufficient to bring projections $i$ out of engagement with the surface of the film.

The insertion of the film is effected by means of a full cassette K which is introduced from the side through an opening in the camera. A few centimetres of the film are withdrawn from the cassette and inserted so far into the film track of the camera that it can be engaged by the cam projections $i$.

By means of a longitudinal movement of the control knob M, the cam lever is positively pivoted about the pivot D, as described above, the projections $i$ forcing the film firmly against the web G of the film support S. It is only when the projections have gripped the film on the web that the film support may be moved and the film advanced by the distance $s$. The distance $s$ is limited by stops.

Instead of the control knob, the longitudinal movement of the film support may also be effected by a steel wire W running over a feed roller R. The steel wire is attached to cam N by means, for example, of a loop passing through an opening provided in the arm of the cam adjacent the wall of the camera with the control knob. By means of the rotational movement of the feed roller R, the steel wire W is wound and causes the rotation of the cam in the counterclockwise direction, thus bringing the two projections $i$ in engagement with the surface of the film, thereby pulling the film and film support in the longitudinal direction. After a pre-determined length of the film has been advanced, a tension spring attached to the cam makes the latter turn in clockwise direction and brings the cam to its initial position with projections $i$ out of engagement with the surface of the film.

What I claim is:

1. In a photographic camera having a film supply: film feeding means comprising a sliding film-support element adjacent the film and parallel thereto, a lever with two arms pivotally mounted on said film-support element and spaced therefrom, the film being arranged between the element and the lever, gripping means arranged on one of said lever arms, longitudinally displaceable control means engaging said lever and pivoting the same in one direction upon longitudinal displacement whereby the gripping means press the film upon the film-support element and engage it therewith, and means for automatically pivoting the lever in the other direction for disengaging the gripping means from the film.

2. The film feeding means of claim 1, wherein said control means comprises a control knob longitudinally displaceably mounted in the camera.

3. The film feeding means of claim 2, wherein said control means comprises a wire attached to said lever and a feed roller carrying said wire and rotatably mounted in the camera to effect longitudinal displacement of the wire.

4. The film feeding means of claim 3, wherein said means for automatically pivoting the lever in the other direction comprises a tension spring attached to the lever and the camera, respectively.

5. The feeding means of claim 1, comprising guide means for slidably mounting said film-support element in the camera.

6. In a photographic camera having an exposure opening and comprising a film supply: film feeding means comprising a sliding film-support element adjacent the film and parallel thereto, a lever with two arms pivotally mounted on said film-support element and spaced therefrom, the film being arranged between the element and the lever, gripping means arranged on one of said lever arms, longitudinally displaceable control means engaging said lever and arranged, upon longitudinal displacement, to pivot the same in one direction, whereby the gripping means engage the film with the film-supporting element, and then, upon further longitudinal displacement, to move said element with the film engaged thereon to said exposure opening, and spring means for automatically pivoting the lever in the other direction for disengaging the gripping means from the film and the film-support element.

7. The film feeding means of claim 6, wherein said control means comprises a control knob longitudinally displaceably mounted in a slot in the camera.

8. The film feeding means of claim 6, wherein said control means comprises a wire attached to said lever and a feed roller carrying said wire and rotatably mounted in the camera to effect longitudinal displacement of the wire.

References Cited in the file of this patent
UNITED STATES PATENTS

| | | |
|---|---|---|
| 1,144,934 | Cutler | June 29, 1915 |
| 1,430,582 | Pittman | Oct. 3, 1922 |
| 1,531,182 | Hartmann | Mar. 24, 1925 |
| 1,676,037 | Lowkrantz | July 3, 1928 |
| 2,043,612 | Frost et al. | June 9, 1936 |
| 2,070,122 | Goldhammer | Feb. 9, 1937 |
| 2,320,441 | Lessler | June 1, 1943 |
| 2,359,429 | Langdon | Oct. 3, 1944 |